United States Patent
Fernandes Goncalves

(10) Patent No.: US 10,601,284 B2
(45) Date of Patent: Mar. 24, 2020

(54) PRIMARY PART OF A LINEAR MOTOR HAVING A COOLING PLATE

(71) Applicant: ETEL S.A., Motiers (CH)

(72) Inventor: Jose Manuel Fernandes Goncalves, Colombier (CH)

(73) Assignee: ETEL S.A., Motiers (CH)

( * ) Notice: Subject to any disclaimer, the term of this patent is extended or adjusted under 35 U.S.C. 154(b) by 274 days.

(21) Appl. No.: 15/841,323

(22) Filed: Dec. 14, 2017

(65) Prior Publication Data

US 2018/0175708 A1 Jun. 21, 2018

(30) Foreign Application Priority Data

Dec. 16, 2016 (EP) .................................. 16204588

(51) Int. Cl.
*H02K 41/02* (2006.01)
*H02K 9/22* (2006.01)
*H02K 9/19* (2006.01)
*H02K 41/03* (2006.01)
*H02K 1/20* (2006.01)

(52) U.S. Cl.
CPC ............... *H02K 9/22* (2013.01); *H02K 1/20* (2013.01); *H02K 9/19* (2013.01); *H02K 41/02* (2013.01); *H02K 41/031* (2013.01)

(58) Field of Classification Search
CPC .......... H02K 41/031; H02K 9/19; H02K 9/22; H02K 41/02; H02K 1/20; H02K 41/0356
USPC ....................................................... 310/12.29
See application file for complete search history.

(56) References Cited

U.S. PATENT DOCUMENTS

| | | | |
|---|---|---|---|
| 4,839,545 A * | 6/1989 | Chitayat | H02K 1/20 310/12.23 |
| 5,642,013 A | 6/1997 | Wavre | |
| 5,751,077 A * | 5/1998 | Gonzalez | H02K 9/19 310/12.29 |
| 5,864,187 A | 1/1999 | Gonzalez | |
| 6,731,028 B2 | 5/2004 | Erhard et al. | |
| 2012/0049658 A1 | 3/2012 | Yoshida et al. | |
| 2012/0062866 A1* | 3/2012 | Binnard | H02K 9/22 355/72 |
| 2014/0312718 A1* | 10/2014 | Li | H02K 41/0356 310/12.29 |
| 2015/0162812 A1* | 6/2015 | Da Conceicao Rosa | H02K 41/031 310/12.29 |
| 2016/0102928 A1* | 4/2016 | Da Concei o Rosa | H02K 41/031 310/12.29 |

FOREIGN PATENT DOCUMENTS

| | | |
|---|---|---|
| EP | 2424087 A2 | 2/2012 |
| EP | 2884638 A1 | 6/2015 |
| WO | WO 2012029998 A2 | 3/2012 |

* cited by examiner

*Primary Examiner* — Thanh Lam
(74) *Attorney, Agent, or Firm* — Leydig, Voit & Mayer, Ltd.

(57) ABSTRACT

A primary part of a linear motor includes a cooling plate with cooling channels mounted to a side of the primary part that faces away from an air gap of the linear motor. The cooling channels are connected to a coolant inlet and a coolant outlet via channels of a distributor. The channels extend between the cooling plate and winding end turns of the primary part in a direction of movement of the linear motor.

9 Claims, 2 Drawing Sheets

PRIMARY PART OF A LINEAR MOTOR HAVING A COOLING PLATE

CROSS-REFERENCE TO PRIOR APPLICATION

Priority is claimed to European Patent Application No. EP 16204588.4, filed on Dec. 16, 2016, the entire disclosure of which is hereby incorporated by reference herein.

FIELD

The present invention relates to a primary part of a linear motor, which primary part is equipped with a cooling plate. To increase the power of a linear motor and to protect the environment from excessive heat input, it is necessary to cool the primary part. This can be accomplished using cooling plates which are disposed near the coils of the primary part.

BACKGROUND

Linear motors are known from U.S. Pat. No. 5,642,013 A, which describes how such drives can be designed in order to avoid or at least significantly reduce cogging forces. In order to cool these motors, that patent proposes to provide cooling channels between the coil-carrying teeth of the iron core. However, such cooling channels reduce the fill factor of the spaces between the teeth. The power of a motor cooled in this manner is lower than that of a motor having a higher fill factor.

U.S. Pat. No. 5,864,187 describes a linear motor that is cooled from the rear side of the lamination stack; i.e., the side opposite the teeth and coils. For this purpose, the epoxy-resin-potted iron core is disposed in an actively cooled metal frame having cooling channels formed in the rear side thereof; i.e., the side facing away from the teeth and coils of the iron core. In an exemplary embodiment, the coolant inlet and outlet are disposed side by side at the same end of the linear motor. A cooling channel extends in a meandering path to the opposite end of the linear motor and back, so that the cooling effect is uniformly distributed over the entire length of the motor. However, producing such meandering cooling channels requires difficult milling operations because of the numerous changes in direction.

U.S. Pat. No. 6,731,028 describes a cooling plate for the primary part of a linear motor, which cooling plate is disposed on the rear side of the primary part. The area between the winding end turns projecting from the lamination stack is filled with a thermally conductive potting compound. The cooling plate has cooling channels of relatively large cross-sectional area formed therein. Therefore, the cooling plate cannot be made very flat and, therefore, adds significantly to the overall height of the primary part. Retrofitting such a cooling plate changes the air gap of the linear motor significantly, or is not possible due to space limitations.

SUMMARY

In an embodiment, the present invention provides a primary part of a linear motor. The primary part includes a cooling plate with cooling channels mounted to a side of the primary part that faces away from an air gap of the linear motor. The cooling channels are connected to a coolant inlet and a coolant outlet via channels of a distributor. The channels extend between the cooling plate and winding end turns of the primary part in a direction of movement of the linear motor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following

DETAILED DESCRIPTION

In an embodiment, the present invention provides a primary part having a particularly flat cooling plate that, even when retrofitted, will not or not significantly change the air gap of the linear motor.

According to an embodiment, a primary part of a linear motor is provided, which primary part has a cooling plate with cooling channels mounted to the side of the primary part that faces away from the air gap of the linear motor. These cooling channels are connected to a coolant inlet and a coolant outlet via channels of a distributor, which channels extend between the cooling plate and the winding end turns of the primary part in the direction of movement.

The cooling plate is made up of first and second plates which are joined together and between which the cooling channels extend transversely to the direction of movement.

The cooling channels between the sheet-metal plates forming the cooling plate are numerous and distributed over the entire area of the plates. The cooling channels are formed by etching or milling, for example, so that the total thickness of the cooling plate is determined by the thicknesses of the two sheet-metal plates. The channels in the distributor serve to supply and discharge the coolant. These channels are disposed laterally of the lamination stack and above the winding end turns of the primary part, and therefore do not add to the overall height. Thus, retrofitting such a cooling plate has only a small effect on the air gap of the linear motor. It is even possible to remove, from the rear side of the lamination stack, a layer equivalent to the thickness of the cooling plate, so that the air gap can remain completely unchanged when the cooling plate is retrofitted. This is possible without significantly adversely affecting the electrical parameters of the linear motor, such as its force constant, because the magnetic flux in this region of the lamination stack is negligible. However, due to the enhanced heat dissipation, the continuously deliverable force and the corresponding motor current are increased.

Figure 1:
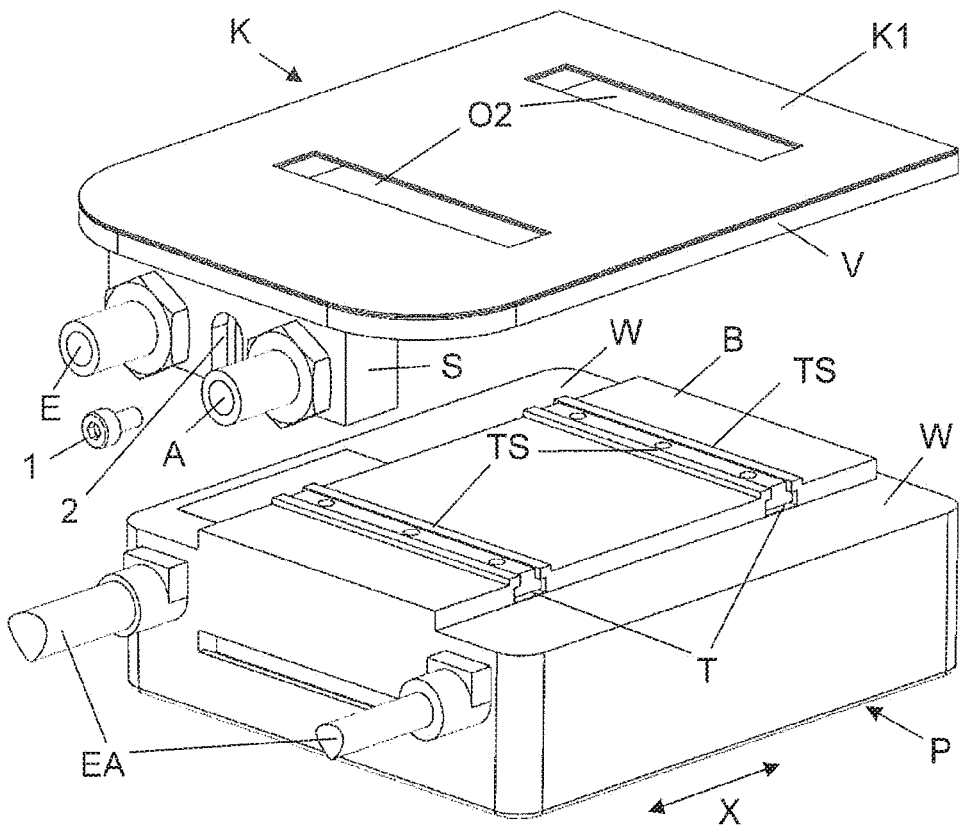
FIG. 1 shows a cooling plate and a primary part prior to assembly in accordance with an embodiment of the present invention.

In FIG. 1, there is shown the primary part P of a linear motor. Lamination stack B of the primary part has iron teeth around which coils are wound. The teeth point toward the secondary part of the linear motor. The secondary part has magnets of alternating polarity arranged thereon. Primary part P and the secondary part are spaced apart by a small distance, the so-called air gap of the linear motor. Winding end turns W of the coils project laterally from lamination stack B and are covered by a potting compound.

Furthermore, lamination stack B is formed in its rear side with mounting openings T that serve for attachment of primary part P to a machine. The illustrated T-shaped slots T are frequently used for this purpose, but threaded holes or the like may also be used.

Moreover, steps TS are discernible in the region of mounting openings T. The raised portions of steps TS serve as abutments against the attachment region of the respective machine, while the slightly recessed portion of lamination stack B comes into contact with cooling plate K. The step height of steps TS is greater than or equal to the thickness of cooling plate K. Tolerances in the manufacture of cooling plate K are irrelevant for the air gap of the linear motor if the maximum thickness of cooling plate K does not exceed the step height.

Steps TS may be formed already during the manufacture of primary part P or, alternatively, at a later time when a cooling plate K is to be retrofitted. In either case, the material to be removed from lamination stack B to form steps TS is insignificant for the functioning of primary part P because only very little magnetic flux must be guided in this region. Thus, even when cooling plate K is retrofitted, the electrical parameters of the linear motor do not change significantly. Due to steps TS, the air gap remains unchanged despite the additionally installed cooling plate K. However, steps TS may also be omitted either if a small change in the air gap is acceptable, or if the machine can be structurally modified in a manner that also allows air gap to be kept constant.

Figure 2:
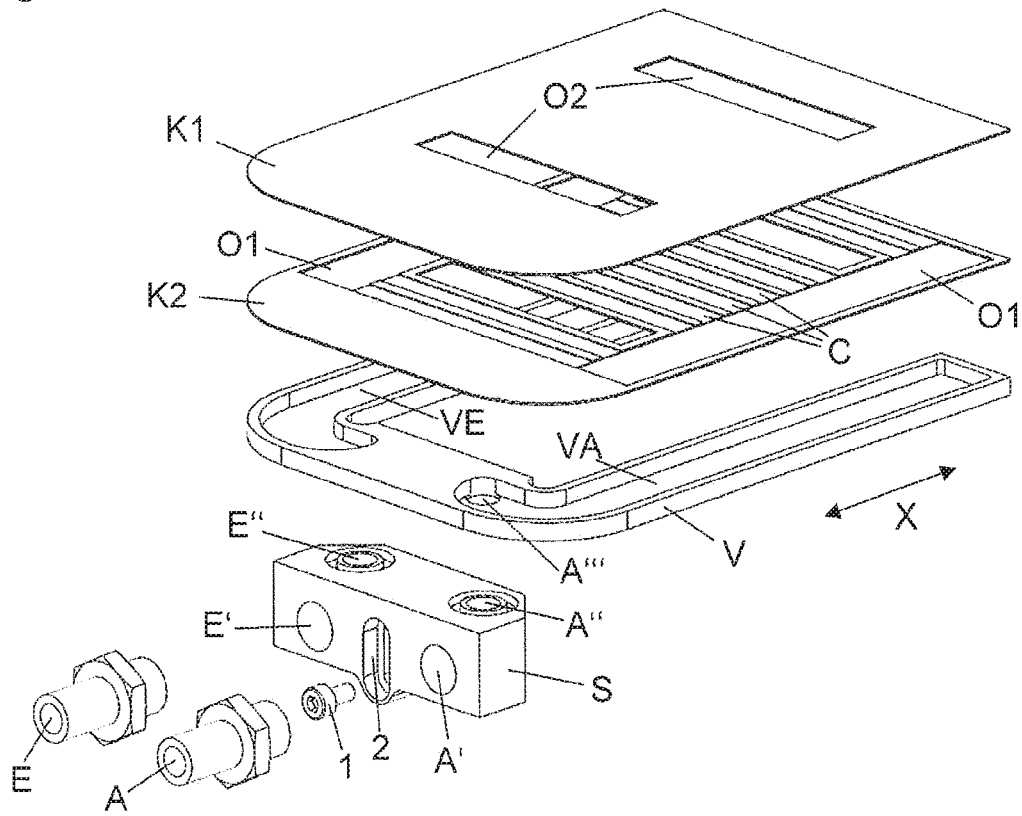
FIG. 2 shows an exploded view of the cooling plate.
Figure 3:
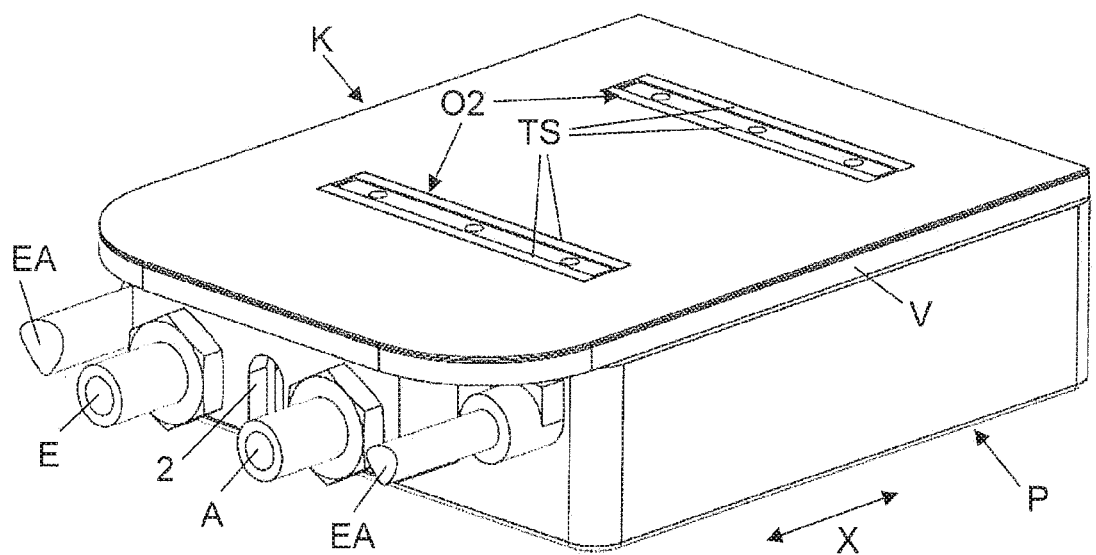
FIG. 3 shows the cooling plate and the primary part prior after assembly.

FIG. 2 illustrates, in exploded view, the construction of cooling plate K. Two plates K1, K2 which are soldered together form the actual cooling plate K. Plates K1, K2 are in the form of sheet-metal plates (e.g., of stainless steel or aluminum) having a thickness of about 0.4 to 0.6 mm, so that in the region of lamination stack B, cooling plate K has a thickness of only about one millimeter. Cooling channels C are etched or milled into one or both two plates K1, K2, the cooling channels extending transversely to the direction of movement X of the linear motor. Although the individual cooling channels C may have a small cross-sectional area, a sufficient number of channels are distributed over the entire surface area, so that, overall, a sufficient amount of coolant can flow through cooling plate K.

In order to supply sufficient coolant to cooling channels C between plates K1, K2, a distributor V is provided, which distributor is disposed substantially between cooling plate K and winding end turns W of primary part P. Inside the distributor V, channels VE, VA extend in the direction of movement X of the linear motor and serve to supply and discharge coolant to and from cooling channels C in cooling plate K via two openings O1 in plate K2. The edges of openings O1 of plate K2, which extend in the direction of movement X, are each soldered to distributor V in a manner that allows coolant to flow from channel VE into cooling channels C and from cooling channels C into channel VA.

Via a connecting piece S, channels VE, VA of distributor V are in communication with a coolant inlet E and a coolant outlet A. Connecting piece S redirects the coolant flow emerging from distributor V perpendicularly to cooling plate K by 90 degrees, so that coolant inlet E and coolant outlet A extend parallel to electrical connections EA of primary part P.

Thus, the coolant passes from coolant inlet E though openings E', E" of connecting piece S into channel VE of distributor V (the corresponding inlet opening of which is hidden from view here) and through outlet opening A''' in distributor V and openings A", A' of connecting piece S back to coolant outlet A.

Connecting piece S and distributor V may be soldered together. Alternatively, they may be joined by a screwed connection. In that case, it is recommendable to provide sealing rings to seal openings E" and A". In FIG. 2 can be seen circular grooves around these openings for receiving such sealing rings.

Cooling plate C; i.e., plates K1, K2, have corresponding mounting openings O2 through which extend steps TS of lamination stack B. Thus, these steps TS can still perform their function as abutment surfaces for the attachment of primary part P to a machine.

Distributor V and connecting piece S form a right angle, which is useful as an abutment during attachment of cooling plate K to primary part P. Fastening is accomplished by means of a screw 1 that is passed through a slotted hole 2 in connecting piece S. This slotted hole 2 allows cooling plate K to be mounted, regardless of whether nor not steps TS were formed at a later stage, and also allows cooling plate K to be used with different types and sizes of motors.

FIG. 2 shows cooling plate K in the mounted condition on primary part P. It can be seen that the steps TS extending through mounting openings O2 are flush with plate K1 or protrude minimally thereabove. Mounting openings O2 also serve for aligning cooling plate K on primary part P. A heat transfer paste between plate K2 and lamination stack B provides for efficient heat transfer.

Figure 4:
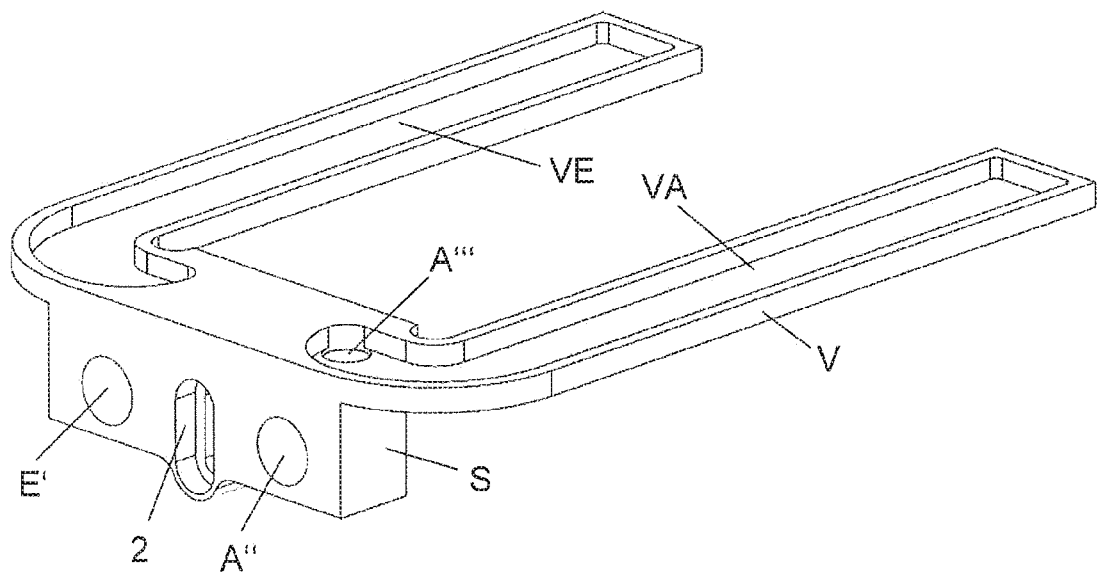
FIG. 4 shows an alternative design of a detail of the cooling plate

FIG. 4 shows an alternative design for distributor V and connecting piece S, which here are integrally formed as a single component. This variant is particularly useful if both cooling plate K and distributor V as well as connecting piece S are made from aluminum. The basic idea of the present invention, which is to make cooling plate K itself particularly thin and to position the large cross-sectional areas of channels VE, VA required to supply and discharge the coolant laterally between winding end turns W and cooling plate K, can also be implemented with this embodiment.

Thus, overall, a cooling plate K is obtained which does or only insignificantly affect the air gap of a linear motor and which therefore is suitable for retrofitting in machines that otherwise cannot be modified in order to keep the air gap constant despite the additional cooling plate K. Nevertheless, cooling plate K is relatively simple to manufacture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A primary part of a linear motor, the primary part comprising:
    a cooling plate with cooling channels mounted to a side of the primary part that faces away from an air gap of the linear motor, wherein the cooling channels are connected to a coolant inlet and a coolant outlet via channels of a distributor, the channels extend between the cooling plate and winding end turns of the primary part in a direction of movement of the linear motor.

2. The primary part as recited in claim 1, wherein the cooling plate includes first and second plates which are joined together and between which the cooling channels extend transversely to the direction of movement of the linear motor.

3. The primary part as recited in claim 2, wherein the first and second plates of the cooling plate are two sheet-metal plates which are soldered together.

4. The primary part as recited in claim 2, wherein the cooling channels are formed into one or both of the first and second plates using a milling process or an etching process.

5. The primary part as recited in claim 1, wherein a lamination stack the of primary part is formed with projecting steps adjacent to mounting openings on the side that faces away from the air gap, the step height of the steps being greater than or equal to a thickness of the cooling plate.

6. The primary part as recited in claim 5, wherein the cooling plate includes first and second plates having coincident openings which correspond to the projecting steps such that the cooling plate is aligned on the primary part by the coincident openings and the steps.

7. The primary part as recited in claim 2, wherein one of the first and second plates which faces the primary part has two openings which extend in the direction of movement of the linear motor and connect to the cooling channels, the openings corresponding to the channels of the distributor and being soldered at an edge to the distributor.

8. The primary part as recited in claim 1, wherein the distributor is connected to a connecting piece configured to redirect coolant flow that emerges from the distributor perpendicularly to the cooling plate by 90 degrees such that the coolant inlet and the coolant outlet extend parallel to electrical connections of the primary part.

9. The primary part as recited in claim 8, wherein the distributor and the connecting piece form a right angle which acts as an abutment for the cooling plate against the primary part.

* * * * *